(12) United States Patent
Lakies

(10) Patent No.: US 11,376,452 B2
(45) Date of Patent: Jul. 5, 2022

(54) DEVICE FOR THE PROVISION OF OXYGEN MASKS WHEN REQUIRED

(71) Applicant: Airbus Operations GmbH, Hamburg (DE)

(72) Inventor: Marcel Lakies, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 931 days.

(21) Appl. No.: 16/164,547

(22) Filed: Oct. 18, 2018

(65) Prior Publication Data

US 2019/0126078 A1    May 2, 2019

(30) Foreign Application Priority Data

Oct. 30, 2017 (DE) .......................... 102017125460.9

(51) Int. Cl.
*A62B 25/00* (2006.01)
*A62B 18/02* (2006.01)
(Continued)

(52) U.S. Cl.
CPC .......... *A62B 25/005* (2013.01); *A62B 18/025* (2013.01); *B64D 11/00* (2013.01); *A62B 7/14* (2013.01); *B64D 2231/025* (2013.01)

(58) Field of Classification Search
CPC ..... A62B 25/00; A62B 25/005; A62B 18/025; A62B 18/02; A62B 7/14; B64D 11/00;
(Continued)

(56) References Cited

U.S. PATENT DOCUMENTS 3,921,388 A    11/1975  Loos et al.
4,154,237 A *  5/1979  Courter ................. B64D 11/00
                                                128/202.13
(Continued)

FOREIGN PATENT DOCUMENTS

CN    101454204 A    6/2009
CN    102307798 A    1/2012
(Continued)

OTHER PUBLICATIONS

German Search Report for German Patent Application serial No. 10 2017 125 460.9, dated Aug. 6, 2018.
(Continued)

*Primary Examiner* — Joseph D. Boecker
*Assistant Examiner* — Brian T Khong
(74) *Attorney, Agent, or Firm* — Jenkins, Wilson, Taylor & Hunt, P.A.

(57) ABSTRACT

A device for the provision of oxygen masks has a closeable container for oxygen masks, an extendable arm having links coupled in articulated fashion and having an outer end, and a driving device. The outer end is coupled to at least one oxygen mask. The arm adopts a storage position in which the arm is arranged completely within the container, and an extended position in which the outer end is moved out of the container and in which the arm holds the oxygen mask at a distance from the container. The driving device is coupled to the arm and passes the links out of the container. The links enclose a pivoting range extending as far as a level juxtaposition of the links. When extended, the arm adopts the level juxtaposition under the action of gravity for the lateral spacing of the relevant oxygen mask from the container.

15 Claims, 7 Drawing Sheets

(51) Int. Cl.
*A62B 7/14* (2006.01)
*B64D 11/00* (2006.01)

(58) Field of Classification Search
CPC ............ B64D 11/0629; B64D 11/0632; B64D 2231/025
See application file for complete search history.

(56) References Cited

U.S. PATENT DOCUMENTS

| | | | |
|---|---|---|---|
| 5,154,374 A | 10/1992 | Beroth | |
| 6,497,386 B2 | 12/2002 | Martinez | |
| 7,789,085 B2 * | 9/2010 | Vogt | B64D 11/00 128/206.27 |
| 8,689,968 B2 | 4/2014 | Polman | |
| 8,745,965 B2 * | 6/2014 | Tiegs | F16G 13/16 59/78.1 |
| 9,751,629 B2 | 9/2017 | Lang et al. | |
| 2005/0263156 A1 * | 12/2005 | Westphal | B64D 25/00 128/205.25 |
| 2014/0367976 A1 * | 12/2014 | Kshirsagar | A62B 7/14 292/336.3 |

FOREIGN PATENT DOCUMENTS

| | | |
|---|---|---|
| CN | 102712367 A | 10/2012 |
| DE | 2360227 A1 | 6/1975 |
| DE | 102004009346 A1 | 9/2005 |
| DE | 102004026649 A1 | 1/2006 |
| DE | 602004007667 T2 | 6/2008 |
| DE | 102011102115 A1 | 11/2012 |
| EP | 1 182 135 A1 | 2/2002 |
| EP | 1654158 B1 | 7/2007 |

OTHER PUBLICATIONS

Chinese Office Action for Application 201811268130.8 dated Jul. 2, 2020.

German Office Action for Application No. 102017125460 dated Feb. 2, 2022.

* cited by examiner

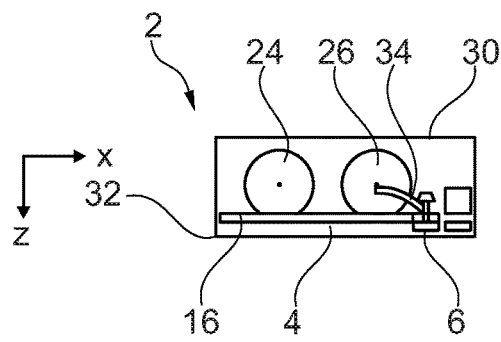
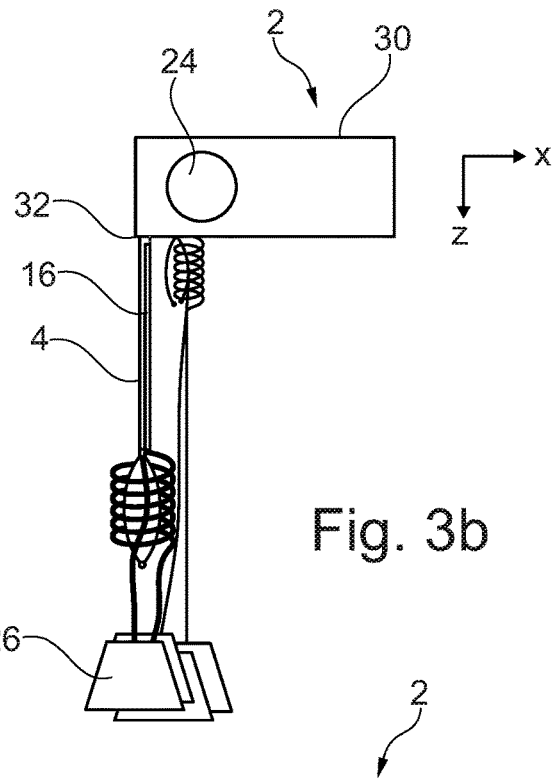
Fig. 3a
Fig. 3b
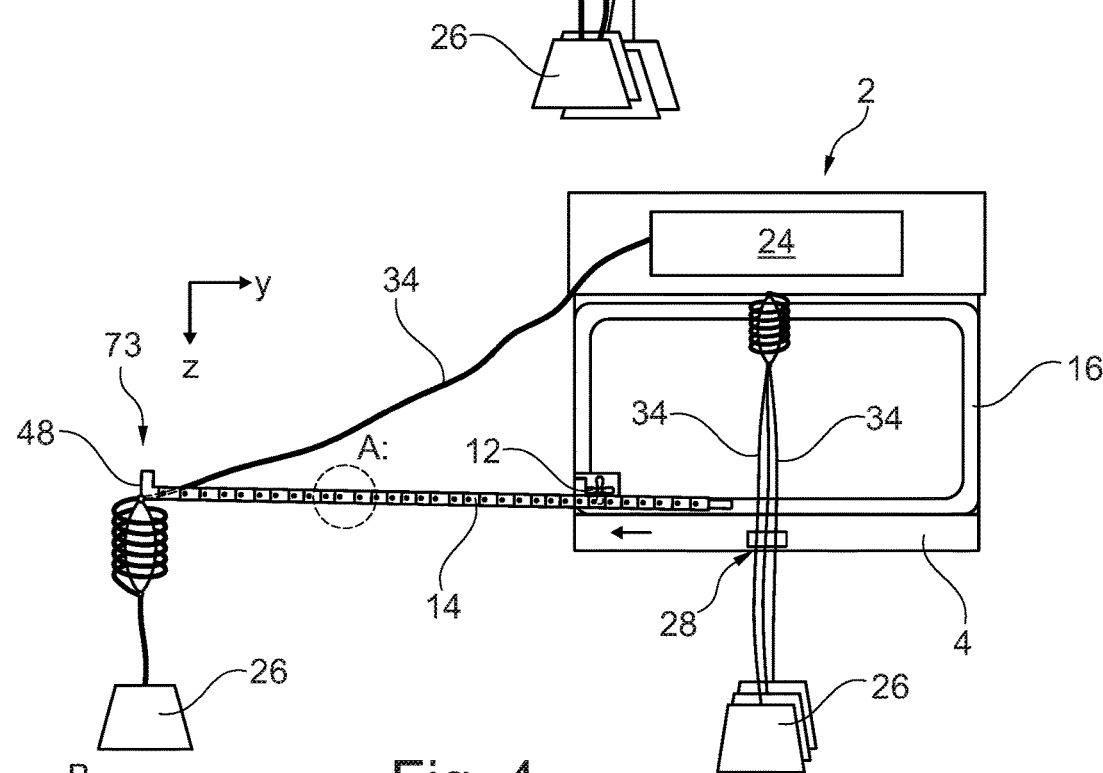
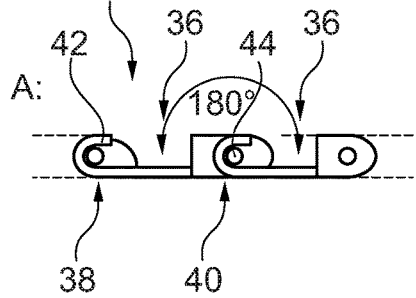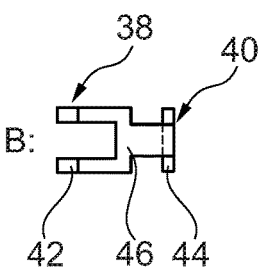
Fig. 4

DEVICE FOR THE PROVISION OF OXYGEN MASKS WHEN REQUIRED

CROSS-REFERENCE TO PRIORITY APPLICATION

This application claims the benefit of, and priority to, German patent application number DE 10 2017 125 460.9, filed Oct. 30, 2017. The content of the referenced application is incorporated by reference herein.

TECHNICAL FIELD

Embodiments of the subject matter described herein relate generally to a device for the provision of oxygen masks when required, to a method for the provision of oxygen masks when required in an aircraft, and to a vehicle having a device for the provision of oxygen masks when required.

BACKGROUND

Oxygen masks are carried in aircraft and, especially, passenger aircraft which fly at high altitudes and have a pressurized cabin. They are dropped automatically from a container above a seat in the event of a pressure drop within the cabin. A person sitting below can grab the oxygen mask, pull it towards them and put it on. Certification regulations require that at least one oxygen mask must be positioned and presented visibly and in a way which enables it to be reached by each passenger (either seated or lying down) when strapped in. When pulled, the oxygen flow into the relevant oxygen mask is generally initiated by a corresponding mechanism. There are also other mechanisms for activating the oxygen flow.

In the case of passenger aircraft, there is a known practice of arranging the said containers for oxygen masks in a grid pattern in supply ducts or recesses situated above passenger seats in a ceiling panel, wherein the grid pattern corresponds substantially to the grid pattern of the passenger seats. In passenger cabins in which means for changing the layout when required are provided, passenger seats can occupy different positions within certain limits. As a result, it may be necessary to adjust the position of the containers in the overhead supply ducts accordingly.

With certain cabin configurations, individual seats may be at a large horizontal distance from the associated/nearest container. Cabin configurations of this kind can only be implemented, especially in terms of certification, if some or all of the stowed oxygen masks in affected containers are at a horizontal distance from the container after the container cover has been opened.

Devices for the provision of oxygen masks in which a certain variability of position can be compensated are furthermore known. For example, patent publication EP 1 654 158 B1 discloses arranging an inflatable lever in a container of this kind, the lever being coupled to an oxygen mask. When the container is opened, the lever is automatically inflated and moves the oxygen mask away from the container in a horizontal direction.

BRIEF SUMMARY

It is therefore an object to propose an alternative device for providing oxygen masks when required, in which a greater horizontal spacing from the container is possible.

This object is achieved by a device for the provision of oxygen masks when required, having the features of independent claim 1. Advantageous embodiments and developments can be found in the dependent claims and the following description.

A device for the provision of oxygen masks when required is proposed, the device having a container, which can be closed by a cover, for accommodating one or more oxygen masks, at least one extendable arm, which has a plurality of links that are coupled in articulated fashion and has an outer end, and at least one driving device, wherein the outer end is coupled to at least one oxygen mask. The arm is designed to adopt a storage position, in which the arm is arranged completely within the container, and an extended position, in which the outer end is moved out of the container and in which the arm holds the oxygen mask coupled thereto at a distance from the container. The driving device is coupled to the arm and is designed to pass the articulatedly coupled links out of the container. The links enclose with respect to one another a pivoting range which extends as far as a level juxtaposition of the links, wherein the device is designed in such a way that, in an extended position, the arm adopts the level juxtaposition under the action of gravity for the lateral spacing of the relevant oxygen mask from the container.

By means of this device, a significantly greater horizontal distance between the container and the relevant seat can be bridged than with known devices. Here, the length of the arm in the extended position can exceed any edge length of the container. The use of a plurality of articulatedly coupled links allows the selective provision of a level and preferably rectilinear arm without having to provide a correspondingly long stowage space. For this purpose, the joints could be designed such that a pivoting axis provided by the joints extends vertically, i.e. perpendicularly to the plane of extent of the level juxtaposition of the links. As an alternative, a pivoting axis of this kind can also extend horizontally, i.e. in the plane of extent of the level juxtaposition of the links and preferably perpendicularly to the extension movement. At the same time, a pivoting limit should be provided to ensure that the shape adopted by the links is maintained even under the action of gravity and subject to tensile forces exerted by the relevant oxygen mask.

The container and the cover for closing the container can correspond to a conventional design, and the integration of the compactable arm does not give rise to any special requirements for modification. Consequently, the entire mechanism for opening the flap can remain substantially unchanged, this being advantageous especially from the point of view of certification. In this context, it should furthermore be ensured that the oxygen masks are arranged on the arms in such a way that all the oxygen masks are dropped from the container, even in the event—however unlikely—that the arm or the driving device jams.

The links coupled to one another in articulated fashion can be implemented in various ways. While two links are the bare minimum for the arm and can each have a length which, at least theoretically, corresponds to no more than the maximum inner edge length of the container, three, four or more links are also possible. As implemented in the following embodiments, it is even possible for a very large number of links to be used, which are juxtaposed in the manner of a chain.

The type and embodiment of the driving device depends on the design of the links. It is possible, for example, for the driving device to have an electric motor and a transmission which is connected to the electric motor and is matched to the respective design of the arm. The transmission can be of self-locking design in order to hold a position of the arm, once reached. However, this is not necessary, and it is also possible to use a design that is not self-locking with other means for protecting the transmission.

However, other driving devices, which are based on stored mechanical energy, may also be considered for reasons of weight. Springs and other mechanisms, by means of which a certain mechanical energy can be stored and released, may be mentioned by way of example.

The driving device and the arm can be arranged on an inner side of the cover. A unit for holding or supporting the individual links of the arm in the storage position can therefore likewise be arranged on the inner side of the cover.

As an alternative, the driving device and the arm can also be arranged directly in the container, independently of the cover.

The cover can be embodied in such a way that, under the action of gravity, it rotates about an axis at one edge, e.g. from a horizontal position to a vertical position. When the driving device and the arm are accommodated, the mass of the cover may increase as compared with known containers. To prevent the risk of injury in the event of contact with the head, a damper may be used to damp the rotary motion of the cover.

Overall, the device according to the disclosure makes it possible to achieve an individually adaptable distance between a container and a passenger seat which significantly exceeds that in other known devices. Moreover, the mechanical arm enables the holding point for an oxygen mask to bear mechanical loads.

In an advantageous embodiment, the arm has a multiplicity of chain links, the pivoting axes of which are arranged in a plane of extent of the chain links and perpendicularly to a longitudinal axis of the arm. As indicated above, the links can have a pivoting limit, enabling the links to be pivoted relative to one another by no more than 180°. Consequently, the links or chain links can be rolled up in a space-saving manner within the container in order then to be unrolled when required. The chain links can also be laid on an encircling track. The unrolling or extension of the arm can be carried out in such a way that the chain links are driven out of the container one by one and automatically adopt a horizontal position under the action of gravity by virtue of the pivoting limit mentioned. The chain links then preferably lie in one plane, or are pivoted by 180° relative to one another. Owing to the pivoting limit, they cannot be deflected by more than the horizontal position under the action of gravity. In this embodiment, the integration of the driving device is particularly simple since a driving wheel or a gearwheel that can engage successively in the chain links is sufficient, ensuring that they are moved into an extended position as the driving wheel or gearwheel rotates.

In an advantageous embodiment, each link has a first end with two mutually spaced joint elements and a second end with a pivot, wherein a web extends from the first end towards the second end. The joint elements are configured to fit around the pivot. The webs of two adjoining chain links are furthermore dimensioned in such a way that, when they pivot through 180° relative to one another, they establish flush surface contact. Consequently, the links or chain links are of mechanically very simple configuration and can be produced very economically. Nevertheless, it is thereby possible to produce an arm of sufficient mechanical stability. The pivoting limit is implemented through the dimensioning of said webs, which are each in surface contact with the respectively adjacent chain links in a level alignment of the arm, that is to say in the case of level juxtaposition. The pivoting movement of two links enclosing an angle of less than 180° is consequently fully free up to an angle of 180°. The pivoting angle from below 180° to 180° is in each case possible only on a specified side of a pair of chain links. It is worthwhile to align all of the chain links in an identical way, ensuring that the permitted pivoting of the pairs of chain links is always on the same side of the arm. The chain links can be produced from a thermoplastic material, e.g. in the form of injection moldings. The chain links can have an elasticity which permits the joint elements to latch onto the pivot of another chain link. To reduce the weight of the chain links, the web can be designed to match the load, being of skeleton construction, for example, with holes to reduce the weight and other measures that are suitable for this purpose.

In another advantageous embodiment, the driving unit can have a spiral spring, which is connected to a drive wheel coupled to the chain links. The use of a spiral spring enables a certain mechanical energy to be stored in the container, and this can be released again to enable the arm to be extended quickly. The storage of energy, i.e. the winding up of the spiral spring, can be implemented by means of a device which is situated within the container and can be reached from outside, if required. For example, there can be a kind of rotary knob or the like in the container, enabling the spring to be wound up by hand. Moreover, the said device can be used to move the arm back into its initial position.

In a preferred embodiment, a receiving channel for the chain links is provided on the cover, said channel running around the rim on the inner side of the cover. The arrangement of a receiving channel or channel on the cover enables an arm in the form of interconnected chain links to be received or held ready. The fact that it runs around the inner side of the cover enables a particularly long length of chain to be accommodated, leading to a maximum possible length of the arm. The arm could then have approximately a length which corresponds to the sum of the lengths of all the internal edges of the container. No special requirements are made of the channel: it can also be implemented in the form of mutually spaced webs, U-shaped holding elements or the like, which define a peripheral channel. The core function of the channel is the reliable retention of the chain and the reliable release thereof. The shape of the channel must be matched to the embodiment of the chain links, allowing them to pivot freely during movement in the channel.

In an advantageous embodiment, a plurality of arms, to each of which one channel is assigned to receive an arm, can be provided. The individual arms can have different lengths, which are matched to the respective situation. Consequently, the respective channels can also be of different designs. However, it is advisable, when using a plurality of channels, to make them of the same design in order to reduce the number of different parts and the degree of individualization in order to reduce costs. A plurality of arms furthermore makes it possible to move masks in different directions, starting from the container.

It is furthermore possible for the arm to be provided with a channel for receiving the interconnected chain links which runs around the rim on the inner side of the cover more than once. It is thereby possible to make available an arm length which significantly exceeds the sum of the lengths of all the inner sides of the cover.

As an alternative, it is also possible for one or more channels for receiving an arm to be arranged in the container, i.e. independently of the cover.

The cover is preferably fitted with a unit for blocking an open state of the cover. This unit can block the cover in an open position, for instance, after said cover has been pivoted out of its closed position into an open position through 90°, for example. For this purpose, the cover can have a lever, a positive-locking element or the like, for example, which is blocked by a unit fixed to the container after a rotation through 90°. This can be implemented, for instance, by means of a latch which is movably mounted and sprung and which, when the lever or some other positive-locking means is touched, is temporarily deflected in order to enable the lever or the other positive-locking means to be bypassed in order then once again to follow the spring movement. The unit fixed to the container is arranged on the cover, in the open position thereof, so as to correspond to the lever.

The device preferably has an unlocking element, which blocks the movement of the arm, wherein it is designed to be released automatically when the cover is opened. The movement of the arm is therefore initiated automatically, without further action, after the container is opened. It may be worthwhile to release the unlocking element only after a certain degree of opening of the cover. This can take place, for instance, in the case of a rotation of the cover through at least 30° and preferably through at least 50° from a horizontal position to a vertical position. If there is a plurality of arms, individual unlocking elements can be used for each arm.

In an advantageous embodiment, the driving device and the arm are arranged on an inner side of the cover. The cover can furthermore comprise a plurality of segments which can be moved relative to one another and which move from a retracted state into an extended state under the action of gravity when the cover is open. As a result, the starting position of the arm when the device is installed can be further away from the container in the vertical direction than with a one-piece cover.

The arm can furthermore have an inner end piece, which has a greater extent than a constriction in the receiving channel. In this case, the outer end of the arm is positioned on a side of the constriction spaced apart from the inner end piece. As a result, it is possible to define a precise end position of the arm through stop contact of the inner end piece with an inward-facing surface of the constriction.

The disclosure furthermore relates to a method for the selective provision of an oxygen mask in an aircraft, said method comprising the steps of opening a cover of a container arranged in a recess in a ceiling region and extending an arm, which comprises at least two articulatedly interconnected links, wherein at least one oxygen mask is coupled to the arm. As an option, unlocking of a drive mechanism for moving the arm can be effected by the opening of the cover. As a further option, the cover can be locked in an open position. The recess can involve a supply duct or a cutout in a ceiling panel.

Finally, the disclosure also relates to an aircraft, which has a cabin with a plurality of seats and a recess, arranged thereabove, in a ceiling region, in which at least one above-mentioned device for the selective provision of an oxygen mask is arranged. The recess can involve a supply duct or a cutout in a ceiling panel.

BRIEF DESCRIPTION OF THE DRAWINGS

Further features, advantages and possible applications of the present disclosure will be found in the following description of the illustrative embodiments and the figures. In this context, all the features described and/or depicted form the subject matter of the disclosure individually and in any combination, irrespective of their combination in the individual claims or the dependency references thereof. In the figures, identical reference signs furthermore represent identical or similar objects.

FIGS. 3a and 3b show the device with a closed (FIG. 3a) and an open (FIG. 3b) cover in a side view.

FIG. 4 shows the device in a side view with the arm extended.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
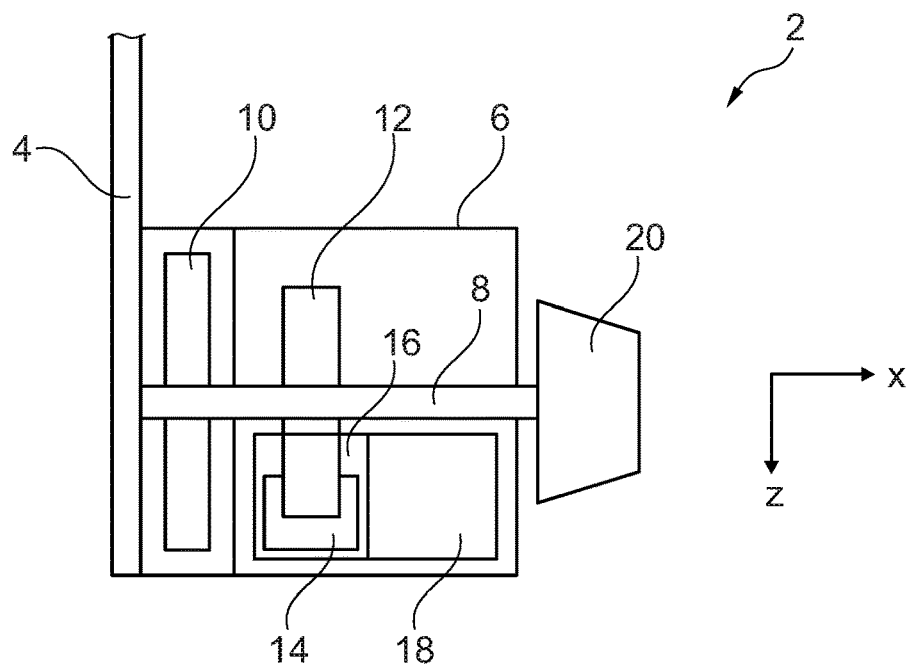
FIG. 1 shows a schematic side view of the device.

FIG. 1 shows a schematic side view of the device 2 according to an embodiment of the invention. By way of example, the device is arranged in a passenger aircraft and is used to provide oxygen masks when there is a pressure drop in a cabin. At some points in the figures, a coordinate system fixed with reference to the aircraft is shown, which has a longitudinal axis x, a transverse axis y and a vertical axis z.

A cover 4 of a container (not illustrated) is shown, on the inner side of which cover a driving device 6 having a housing is arranged. The driving device 6 has a shaft 8, which is connected to a spiral spring 10. A driving wheel 12 in the form of a gearwheel is furthermore connected to the shaft 8 and coupled to an arm 14, which comprises individual chain links (shown in following figures). The arm 14 is laid in a first channel 16 and can be moved freely there. There is an adjacently arranged second channel 18, which is suitable for accommodating another arm (not shown). By way of example, a rotary knob 20 is furthermore arranged on the shaft 8, which is used to wind up the spiral spring 10 and to move the arm back into the initial state thereof.

As indicated by the coordinate system on the right next to the illustration, the cover 4 is in an open position, in which it is arranged substantially vertical, that is to say parallel to the vertical axis z of the aircraft. When the cover 4 is closed, the housing of the driving device 6 is not visible and is concealed in the container above passenger seats (not shown).

Figure 2:
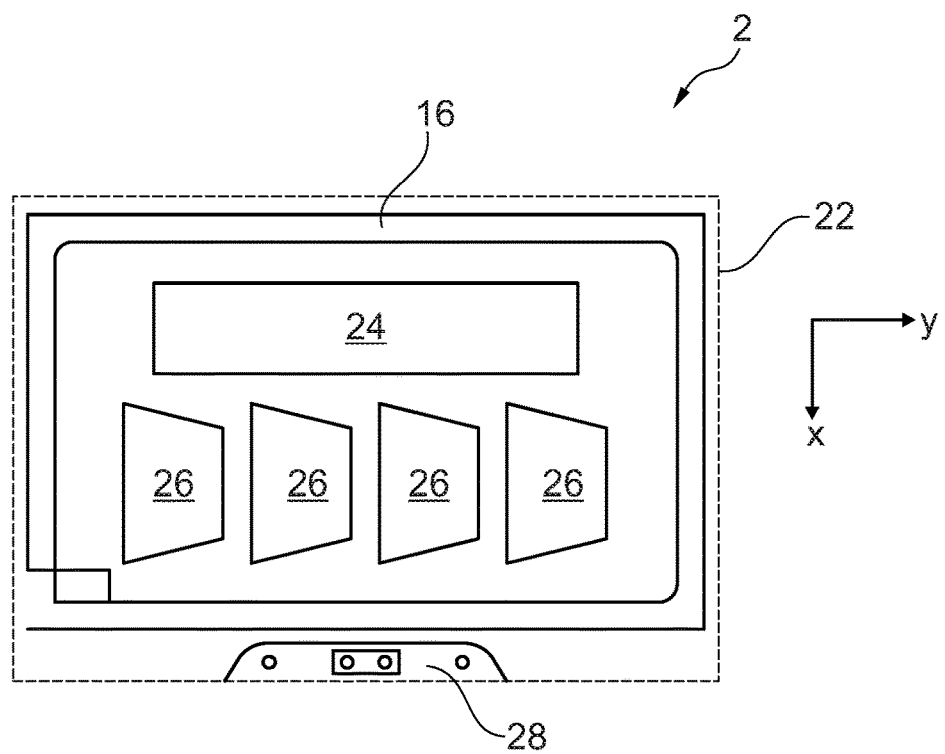
FIG. 2 shows a schematic plan view of the device.

In FIG. 2, the device 2 is shown in a plan view from above. Here, a container rim 22 that defines the interior of the container is illustrated by a dashed line. Purely by way of example, a separate oxygen source 24 is shown, which is coupled to a plurality of oxygen masks 26. Consequently, the device can be used for a decentralized oxygen supply. Of course, it can also be used with a centralized oxygen supply.

By way of example, the arrangement comprising the oxygen source 24 and the oxygen masks 26 is surrounded by the first channel 16 for the arm 14, which substantially runs around the container rim 22 on the inner side of said rim, occupying the rim. A mechanism 28 for opening the cover 4, which could correspond to a conventional mechanism, is furthermore indicated.

FIG. 3a shows a closed container 30 in a side view. This shows an illustrative position of the drive housing 6, which is adjoined by the channel 14. The cover 4 is closed. The oxygen source 24 is arranged in the vicinity of a hinge 32 of the cover 4, while the oxygen masks 26 are arranged on a side of the container 30 remote therefrom. Oxygen hoses 34, which couple the oxygen masks 26 to the oxygen source 24, are furthermore indicated.

FIG. 3b shows the container 30 in the same view, the cover 4 here being opened by pivoting around a hinge axis defined by a hinge 32. It can be seen that the driving unit 6 has been swung open with the cover 4 and the channel 16 arranged thereon. The oxygen masks 26 hang below the container 30 and the cover 4 and can be grasped by a user.

An extended arm 14, which comprises a plurality of chain links, is shown by way of example in a front view in FIG. 4. These chain links are illustrated in detail in a partial view.

Here, a chain link 36 has a first end 38 and a second end 40. Two mutually spaced joint elements 42 are arranged at the first end 38, while a pivot 44 is arranged at the second end 40. Both joint elements 42 can be moved into a latched connection with the pivot 44. The latched connection is intended merely to fix the position of the joint elements 42 and the pivot 44 relative to one another, wherein it should be possible to carry out a free rotation in a pivoting range up to 180°, which is indicated in detail view A.

A web 46 extending between the first end 38 and the second end 40 is designed in such a way that it comes into flush surface contact with a web of adjacent chain links 36 when these are in a level arrangement, that is to say level juxtaposition, that is to say parallel to one another. As a result, as the arm 14 is extended by driving the driving wheel 12, the horizontal or lateral extension, shown in FIG. 4, of the relevant oxygen mask 26 to a distance away from the container 30 can be carried out. By way of example, a single oxygen mask 26 is situated at a holding point 48 of the arm 14.

FIG. 4 furthermore indicates how the channel 16, from which the arm 14 is extended, extends on the inner side of the cover 4. The path of motion through the channel 16 is matched to the possible pivotability of the links 36.

Figure 5:
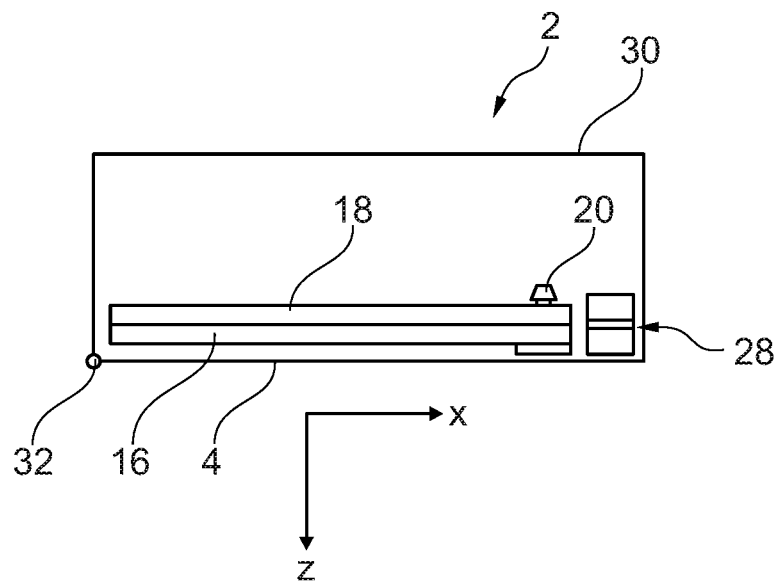
FIGS. 5 and 6 show a schematic illustration of a plurality of channels (FIG. 5) and of one channel with a plurality of turns (FIG. 6), in each case in a side view.

FIG. 5 shows a container 30 in which the two channels 16 and 18 are present as in FIG. 1. It is thereby possible to move two oxygen masks 26 away from the container 30 in different directions.

Figure 6:
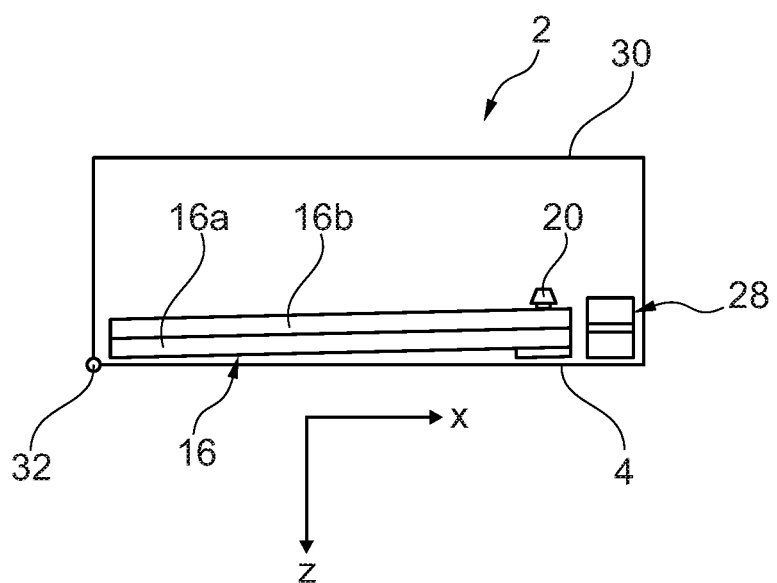

FIG. 6 shows a slight modification, in which a single channel 16 is present, which has two interconnected turns 16a and 16b. When a channel of this kind is used, an arm 14 can consequently extend over a significantly greater length from the container 30 than with a channel 16 that has only a single turn. In other words, a channel of this kind with a plurality of turns makes it possible to accommodate significantly longer arms 14 than with a channel 16 that has only a single turn. In addition to two turns, it is of course also possible to use more turns.

Figure 7:
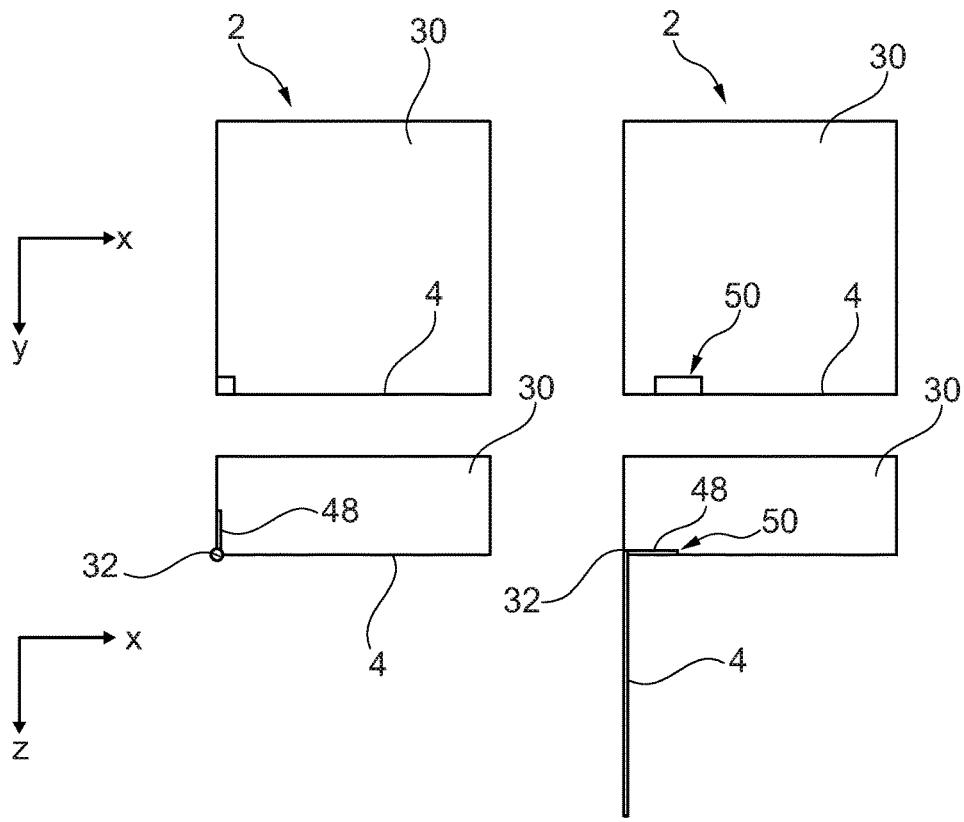
FIG. 7 shows a detail of the cover in two different stages of opening and in each case in two different views.

It is worthwhile to fix the cover 4 in its pivoted-open position. The channels 16 and 18 and, consequently, the arms deployed therefrom are thereby fixed in space. This is shown in the illustrations in FIG. 7. This shows a cover 4 which is fitted in a region of the hinge 32 with a lever 48 that is arranged rigidly on the cover 4 at a 90° angle to the plane of extent of said cover 4. When the cover 4 pivots around the axis defined by the hinge 32, the lever 48 consequently pivots from a vertical to a horizontal position. In a corresponding position within the container 30, a latching mechanism 50, into which the lever 48 latches, can be provided. Consequently, the cover 4 remains in the pivoted-open vertical position.

Figure 8:
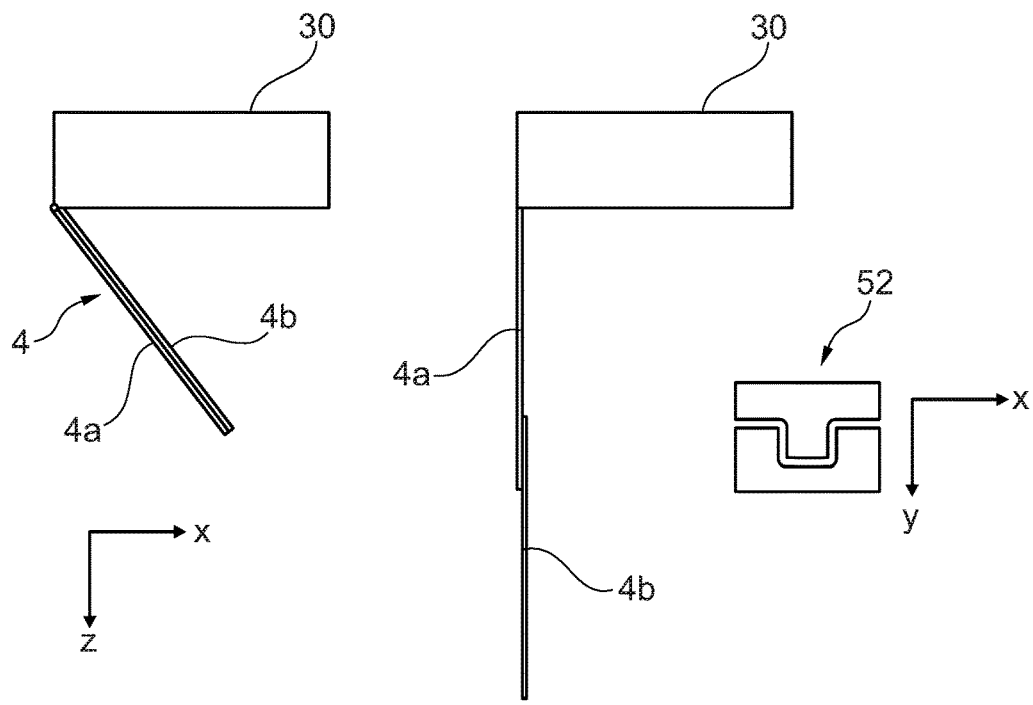
FIG. 8 shows a cover having movable cover segments in a side view.

In order to bridge larger distances between the passenger seating locations to be supplied and the installation location of the container, the cover 4 can comprise two segments 4a and 4b that can be moved relative to one another. As illustrated, for instance, on the right-hand side of FIG. 8, segment 4b can slide along segment 4a under the action of gravity, making it possible to establish a greater vertical distance from the container 30 at the channel 16 secured on segment 4b, which is then at the bottom, or at other components of the device. This makes it possible to start the movement of the arm below opened luggage bins or similar obstacles. For the movable guidance of the two segments 4a and 4b relative to one another, it is possible, for example, to use a guide element 52, which is illustrated only schematically in a detail in FIG. 8.

Figure 9:
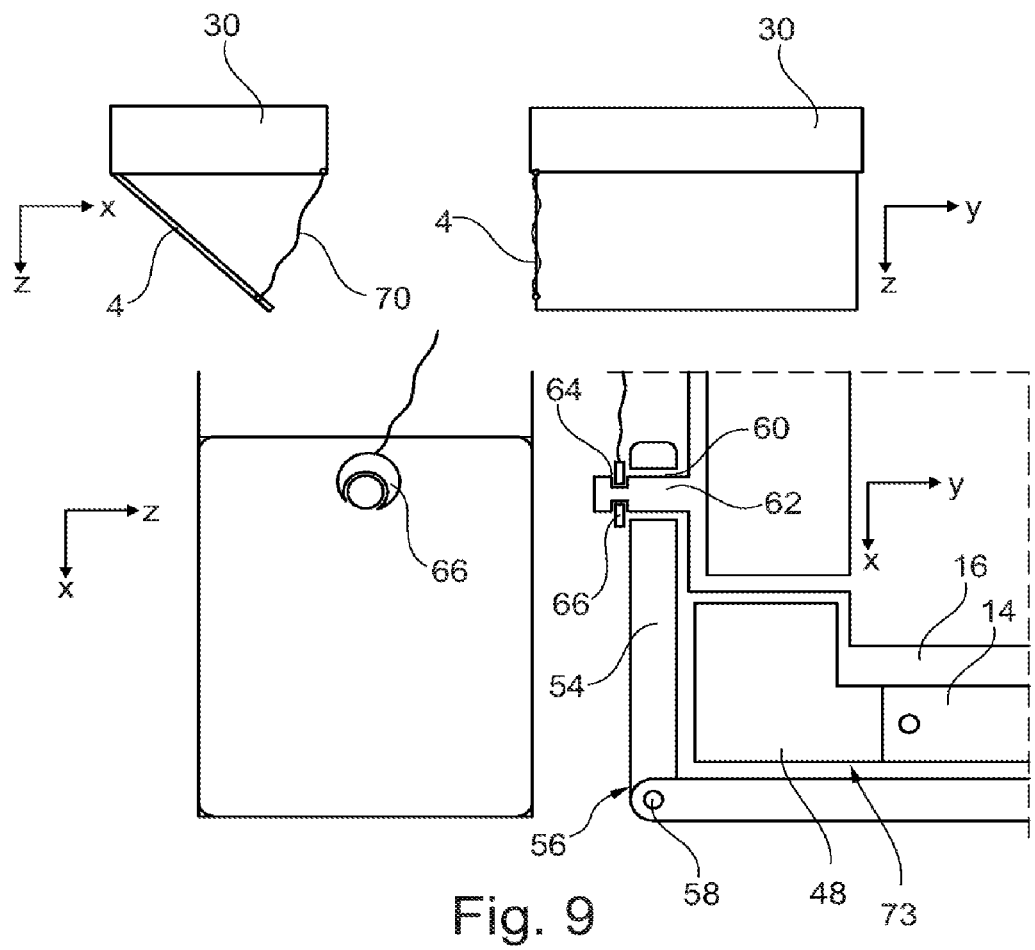
FIG. 9 shows schematically an unlocking unit in a number of schematic views.
Figure 10:
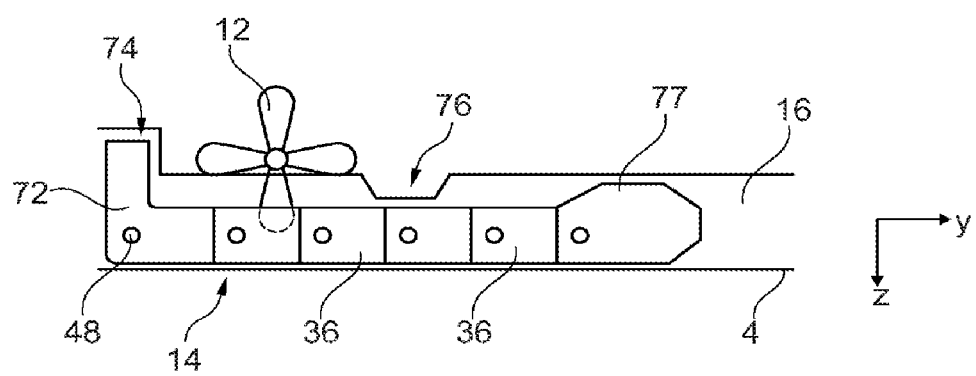
FIG. 10 shows a detail of a channel with an arm situated therein, in a schematic side view.

In FIG. 9, blocking and initiation of a movement of the arm 14 are illustrated. The arm 14 is situated in the channel 16 and can be urged to make an extension movement by the spiral spring 10, for example. However, this is prevented by an unlocking element in the form of a locking flap 54, ensuring that the arm 14 remains in its retracted position. Unlocking can take place in an approximately 50° position, thus enabling a test position to be achieved, in which a cover 4 can be opened without the oxygen masks being dropped.

The locking flap 54 is mounted pivotably at one end 56 on a hinge 58, which is connected to the cover 4. The locking flap 54 has a hole 60, in which a pin 62 arranged on the cover 4 is inserted. This pin has a recess 64, which is provided with a retention element 66. Together with a frame of the cover 4, the retention element 66 holds the locking flap 54 fast. If the retention element 66 is pulled out of the recess 64, the locking flap 54 can move over the pin 62, pivots around the hinge 58 and releases the arm 14. The retention element 66 can be embodied as a crescent-shaped retention element 66, as shown in the side view. The retention element 66 can be connected to one point on the container 30 by means of a cord 70, ensuring that the retention element 66 is automatically pulled by the pin 62 when the cover 4 is pivoted open and the rotation exceeds a defined angle. The retention element 66 can be embodied with an elasticity such that it can easily be pulled by the pin 62 through elastic deformation.

Purely for further illustration, a possible form of a driving wheel 12 is shown, which engages in chain links 36 in order to move the arm 14 out of its channel 16. The illustration of the driving wheel 12 is greatly simplified and, depending on the type and embodiment of the chain links 36, it is also possible for there to be more teeth.

For the precise positioning of the arm 14 in the corresponding channel, an end piece 72 can be provided on an outer end 73, said end piece carrying the holding point 48 already mentioned above. This comes into stop contact with an offset 74 of the channel 16. For more precise guidance of the arm 14, the channel 16 can have a constriction 76 in a region of the driving wheel 12 remote from the offset 74, thereby furthermore enabling force to be introduced from the holding point 48 into the cover 4. The arm 14 furthermore has an inner end piece 77, which comes into stop contact with an inward-facing end of the constriction 76. It is thereby possible to clearly determine the end position of the arm 14.

Figure 11A:
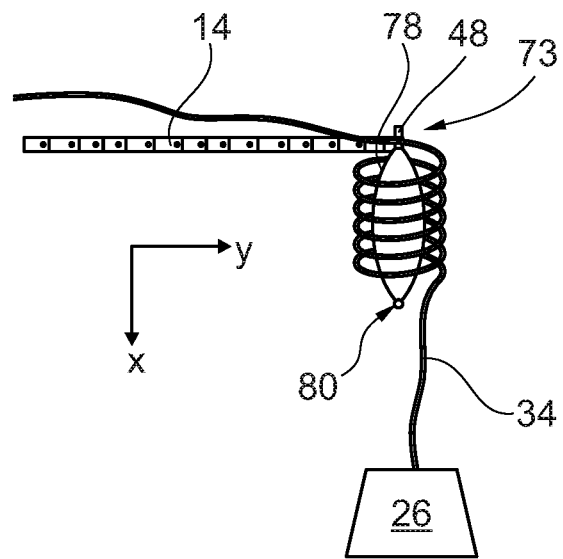
FIGS. 11a and 11b show a loop for holding an oxygen hose with the arm extended.
Figure 11B:
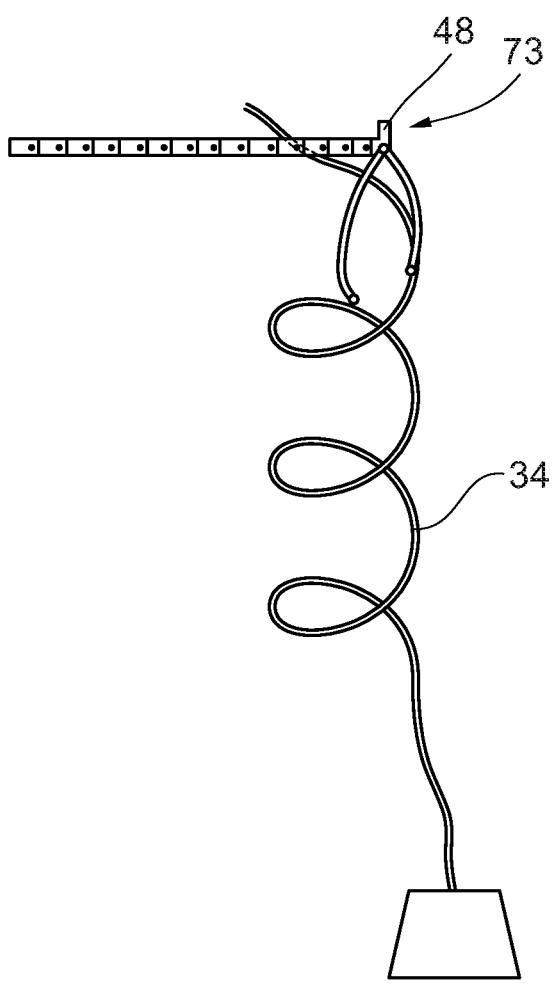

FIGS. 11*a* and *b* show an extended arm 14 with an oxygen mask arranged thereon, in which an oxygen hose 34 is wound up (FIG. 11*a*) and loose (FIG. 11*b*), respectively. In the variant illustrated, it is envisaged that the oxygen flow is not activated by pulling on the mask but as soon as a pressure sensor has detected the first breath drawn after fitting. In FIG. 11*a*, a loop 78 is provided, which, by way of example, can be closed and opened by means of a pushbutton 80. When the oxygen mask 26 is moved outwards from the container 30, it reaches a position in which it can be grasped reliably by virtually all passengers (with the exception of children, for example). When the oxygen mask 26 is grasped and pulled towards the user, the pushbutton 80 should open easily, ensuring that the wound-up part of the hose 34 is freed and the oxygen mask 26 can be put on.

Figure 12A:
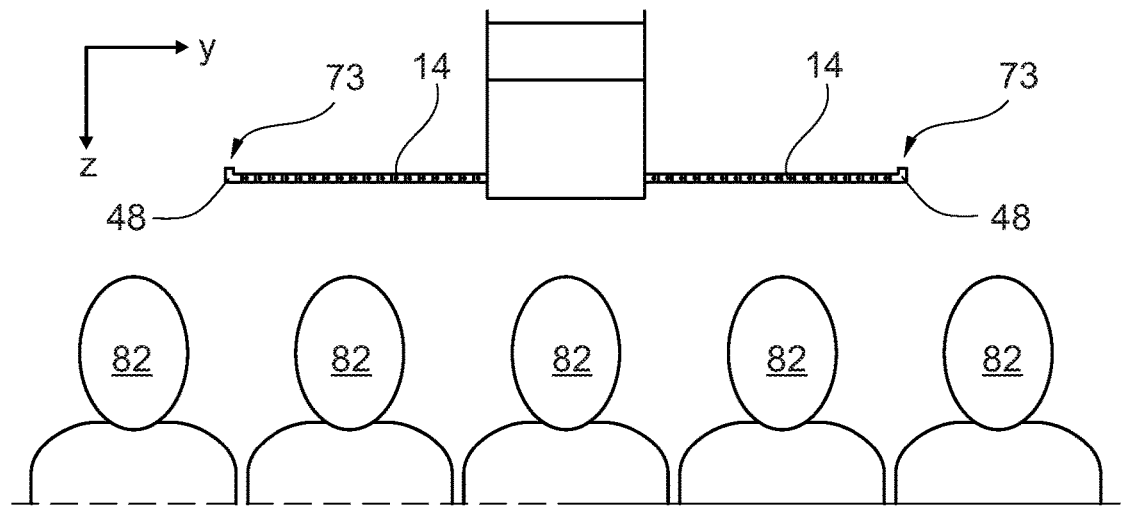
FIGS. 12a and 12b show two extended arms with and without contact with passengers, each in a schematic illustration.
Figure 12B:
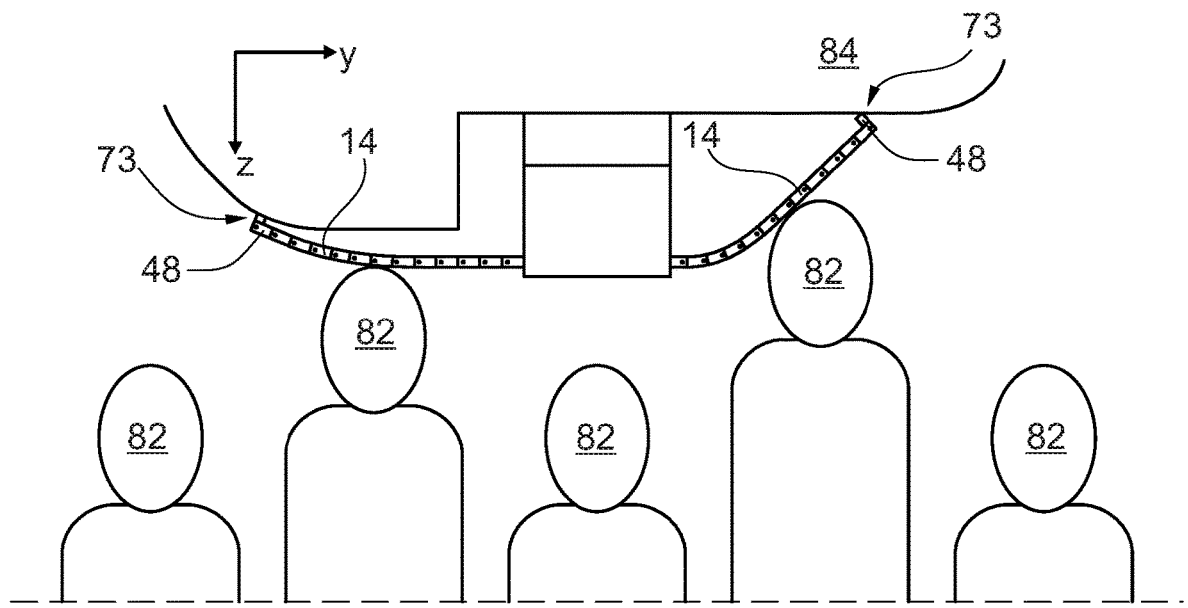

Further advantages of the device 2 are illustrated schematically in FIGS. 12*a* and 12*b*. The device 2 can be used in various cabins which have ceiling areas of various designs. Thus, FIG. 12*a* shows schematically a relatively low ceiling structure, where the arms 14 are positioned only just above individual users 82. When individual passengers 82 stand up (see FIG. 12*b*) or if a seated passenger presses against the arm with their hands or arms, the advantageous design with individual chain links nevertheless makes it possible to reliably prevent damage to the arms 14. By virtue of their upwardly unlimited pivotability, these simply give way towards fittings 84 situated above.

In addition, it should be pointed out that "having" does not exclude other elements or steps, and "a" or "an" does not exclude a multiplicity. It should furthermore be pointed out that features which have been described with reference to one of the above illustrative embodiments can also be used in combination with other features of other illustrative embodiments described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for the provision of oxygen masks, the device comprising:
   a container, closeable by a cover, to accommodate one or more oxygen masks;
   at least one extendable arm comprising a plurality of links coupled in articulated fashion, and comprising an outer end;
   at least one driving device;
   wherein the outer end is coupled to at least one oxygen mask;
   wherein the arm is configured to adopt a storage position, in which the arm is arranged completely within the container, and an extended position, in which the outer end is extended out of the container and in which the arm holds the at least one oxygen mask coupled thereto laterally at a distance from the container;
   wherein the driving device is coupled to the arm and is configured to pass the plurality of links successively out of the container;
   wherein the plurality of links enclose, with respect to one another, a pivoting range which extends as far as a level juxtaposition of the plurality of links; and
   wherein the device is configured such that, in an extended position, the arm adopts the level juxtaposition of the plurality of links under an action of gravity for the lateral distance of the at least one oxygen mask from the container.

2. The device according to claim 1, wherein the plurality of links of the arm comprises a multiplicity of chain links, the pivoting axes of which are arranged in a plane of extent of the links and perpendicularly to a longitudinal axis of the arm.

3. The device according to claim 2, comprising, on the cover, at least one channel for receiving the interconnected chain links of the at least one arm, the at least one channel being disposed around a rim on an inner side of the cover.

4. The device according to claim 3, wherein the at least one extendable arm comprises a plurality of extendable arms and the at least one receiving channel of the cover comprises a plurality of receiving channels, wherein each of the plurality of channels is assigned to receive a corresponding one of the plurality of extendable arms.

5. The device according to claim 3, wherein the at least one channel extends more than once around the rim on the inner side of the cover.

6. The device according to claim 3, wherein:
   the arm has an inner end piece, which has a greater size than a constriction in the receiving channel; and
   the outer end of the arm is positioned on a side of the constriction, spaced apart from the inner end piece.

7. The device according to claim 1, wherein:
   each link of the plurality of links has a first end, which has two mutually spaced joint elements, a second end, which has a pivot, and a web that extends from the first end towards the second end;
   the joint elements are configured to fit around the pivot of an adjoining link of the plurality of links; and
   the webs of two adjoining links are dimensioned in such a way that, when pivoting through 180° relative to one another, a flush surface contact is established.

8. The device according to claim 1, wherein the driving device has a spiral spring connected to a drive wheel, which is coupled to the plurality of links.

9. The device according to claim 1, wherein the cover is fitted with a unit for blocking an open state of the cover.

10. The device according to claim 1, comprising an unlocking element that blocks the movement of the arm when required and is configured to be released automatically when the cover is opened.

11. The device according to claim 1, wherein:
    the driving device and the arm are arranged on an inner side of the cover; and
    the cover comprises a plurality of segments, which are movable relative to one another and are configured to move from a retracted state into an extended state under the action of gravity when the cover is open.

12. An aircraft comprising:
a cabin;
a plurality of seats in the cabin;
a recess arranged above the plurality of seats; and
at least one device according to claim 1 arranged in the recess.

13. A method for selective provision of at least one oxygen mask in an aircraft, the method comprising:
coupling the at least one oxygen mask to an arm;
opening a cover of a container arranged in a recess in a ceiling region; and
extending the arm, which has at least two articulatedly interconnected links, with a driving device.

14. The method according to claim 13, comprising unlocking a driving device to move the arm.

15. The method according to claim 13, comprising locking the cover in an open position.

\* \* \* \* \*